United States Patent
Ohama et al.

(10) Patent No.: US 8,549,510 B2
(45) Date of Patent: Oct. 1, 2013

(54) FIRMWARE UPDATE APPARATUS AND METHOD

(75) Inventors: Nobuyuki Ohama, Tokyo (JP); Yuichi Nakamura, Tokyo (JP)

(73) Assignee: Hitachi Solutions, Ltd., Tokyo (JP)

(*) Notice: Subject to any disclaimer, the term of this patent is extended or adjusted under 35 U.S.C. 154(b) by 434 days.

(21) Appl. No.: 13/054,943

(22) PCT Filed: Aug. 21, 2009

(86) PCT No.: PCT/JP2009/064603
§ 371 (c)(1),
(2), (4) Date: Jan. 20, 2011

(87) PCT Pub. No.: WO2010/035596
PCT Pub. Date: Apr. 1, 2010

(65) Prior Publication Data
US 2011/0131563 A1  Jun. 2, 2011

(30) Foreign Application Priority Data
Sep. 24, 2008  (JP) ................................. 2008-244754

(51) Int. Cl.
*G06F 9/44* (2006.01)

(52) U.S. Cl.
USPC ............ 717/168; 717/170; 717/171; 717/173

(58) Field of Classification Search
None
See application file for complete search history.

(56) References Cited

U.S. PATENT DOCUMENTS

| | | | |
|---|---|---|---|
| 6,311,322 B1 | 10/2001 | Ikeda et al. | |
| 6,574,754 B1 | 6/2003 | Smith | |
| 6,640,334 B1* | 10/2003 | Rasmussen | 717/171 |
| 2003/0106051 A1* | 6/2003 | Morrison et al. | 717/170 |
| 2004/0093597 A1* | 5/2004 | Rao et al. | 717/171 |
| 2005/0229173 A1* | 10/2005 | Mihm et al. | 717/171 |
| 2008/0059960 A1 | 3/2008 | Akiyoshi | |
| 2008/0109798 A1* | 5/2008 | Gavens et al. | 717/168 |

(Continued)

FOREIGN PATENT DOCUMENTS

| | | |
|---|---|---|
| JP | 11-110218 A | 4/1999 |
| JP | 2000-187588 A | 7/2000 |

(Continued)

OTHER PUBLICATIONS

Microsoft, Backup and Recovery, Chapter 20, 2005, pp. 2-6 and 12-23.*

(Continued)

*Primary Examiner* — Thuy Dao
*Assistant Examiner* — Mongbao Nguyen
(74) *Attorney, Agent, or Firm* — Mattingly & Malur, PC (57) ABSTRACT

The firmware update apparatus is configured so that data required for update is accessible from both of normal firmware and emergency firmware and is provided with a section which sets the next-time boot destination to the emergency firmware during update, a section which saves a file before update into an area originally occupied by an update file, a section which inspects that a file required for booting the normal firmware is not broken or confirms that activation is actually possible from a virtualized environment, during activation of the emergency firmware, a section which restores the state before update by the saved files before update and a new update procedure automatically generated by reversing the contents of operations of the update procedure, and a section which, for each update file, describes a necessary reactivation target in the update procedure.

12 Claims, 5 Drawing Sheets

(56) References Cited

U.S. PATENT DOCUMENTS

| | | | |
|---|---|---|---|
| 2008/0120610 A1* | 5/2008 | Katano et al. | 717/168 |
| 2008/0168434 A1* | 7/2008 | Gee et al. | 717/173 |
| 2008/0168435 A1* | 7/2008 | Tupman et al. | 717/173 |
| 2008/0189693 A1* | 8/2008 | Pathak | 717/168 |
| 2009/0271780 A1* | 10/2009 | B. et al. | 717/173 |
| 2009/0307677 A1* | 12/2009 | Long et al. | 717/168 |
| 2010/0058316 A1* | 3/2010 | Ha et al. | 717/170 |
| 2010/0169876 A1* | 7/2010 | Mann | 717/170 |

FOREIGN PATENT DOCUMENTS

| | | |
|---|---|---|
| JP | 2001-331379 A | 11/2001 |
| JP | 2008-84304 A | 4/2008 |
| WO | 2005/041020 A1 | 5/2005 |

OTHER PUBLICATIONS

IBM, Managing the Advanced System Management Interface, 2007, pp. 11-23.*

Sun Microsystems, Managing RAS Features and System Firmware, Chapter 2, 2007, pp. 5-13.*

Chinese Office Action received in Chinese Application No. 2009801374767 issued Jan. 31, 2013.

* cited by examiner

FIRMWARE UPDATE APPARATUS AND METHOD

TECHNICAL FIELD

The present invention relates to a firmware update apparatus and method.

BACKGROUND ART

Conventionally, there has been commonly performed a method in which, when a fault is found in any of all the data stored in advance in a nonvolatile storage memory of an integrated apparatus, for example, an OS or an application (hereinafter referred to as "firmware") after the integrated apparatus is released, the fault is cleared by rewriting the firmware with firmware for which the fault has been cleared.

For example, Patent Document 1 discloses a system adopting a dual configuration in which two versions of new firmware and current firmware are held. Here, the new firmware and the current firmware can be manually switched by an external console. According to Patent Document 1, even if there is any trouble during update, for example, power is cut off during update or an unexpected operation is performed, and update is terminated before completion, it is possible to complete update by re-performing update from the beginning from the external console. It is also possible to, if the state of update is managed, resume update not from the beginning but from the point at which the trouble occurs. Furthermore, it is possible to activate the system by switching the new firmware to the previous-version firmware. That is, there is an advantage that it is possible to resume update or return to the previous-version firmware even if a trouble occurs during update.

Patent Document 1: JP Patent Publication (Kokai) No. 11-110218A

DISCLOSURE OF THE INVENTION

Problems to be Solved by the Invention

However, since the firmware update apparatus disclosed in Patent Document 1 adopts the dual configuration, it has a disadvantage that double firmware capacity is required in comparison with those without a backup and, therefore, the apparatus development cost is higher. Furthermore, in the case where booting is impossible, an external console is necessarily required to cope with it, and a general user cannot easily make a modification himself.

Furthermore, in this apparatus, it is necessary to perform activation processing after update because the apparatus is stopped to update firmware. In other firmware update apparatuses which rewrites firmware without stopping the apparatus also, it is necessarily required to activate the apparatus after rewriting. If reactivation is always required, it takes much time to perform firmware update processing.

The present invention has been made in view of the above situation and provides firmware update processing which is capable of saving nonvolatile memory for storing firmware and preventing system down due to failure in booting and which does not necessarily require reactivation while having fault tolerance equal to that of the conventional dual configuration capable of resuming update and returning to a previous version when a trouble occurs during update.

Means for Solving the Problems

In order to solve the above problems, the present invention is a firmware update apparatus comprising firmware and provided with a function of updating the firmware, the firmware update apparatus comprising: an operation processing section which executes firmware update processing for each file of the firmware in accordance with an update program; a volatile memory which temporarily stores data; and a nonvolatile memory which continuously stores data. The nonvolatile memory holds normal firmware which operates at normal times and emergency firmware which operates in the case of emergency, including the time of failure in rewriting of the normal firmware. The emergency firmware is of a smaller size than the normal firmware and is provided with only a function of enabling the update program to be executed. In the case of performing update processing of the normal firmware, the operation processing section sets the next-time boot destination to the emergency firmware before the update processing and executes the update processing, and, after the update processing, sets the next-time boot destination to the normal firmware.

The nonvolatile memory includes a temporary-saving area for temporarily storing a file before update and an update data area for storing an update file. In this case, the operation processing section stores the file before update into the temporary-saving area, deletes the file before update stored in the temporary-saving area from the temporary-saving area after executing the update processing, and stores the file before update into the update data area by replacing the corresponding update file with the file. The capacity of the temporary-saving area is set to be the capacity of the maximum-size file among multiple files constituting the normal firmware.

Furthermore, the nonvolatile memory includes an update procedure description area in which an update procedure is described, and an update state description area in which an update state of each of files constituting the normal firmware is described. In this case, the operation processing section executes the update program in accordance with the update procedure and describes an update log in the update state description area. The update procedure further includes, for each of the files constituting the normal firmware, information about whether or not reactivation is necessary when the update processing is completed. In this case, the operation processing section performs reactivation for a file required to be reactivated, after the update processing ends.

If the emergency firmware is activated, the operation processing section checks whether there is a breakage of a file required for booting the normal firmware, and sets the next-time boot destination to the normal firmware after executing the update processing.

When the emergency firmware is activated, the operation processing section judges whether or not activation of the normal firmware is possible, and, if activation is possible, sets the next-time boot destination to the normal firmware. On the other hand, if activation is not possible, the operation processing section restores the normal firmware to a state in which activation is possible, using the files before update stored in the temporary-saving area, and then sets the next-time boot destination to the normal firmware.

Further features of the present invention will be apparent from Best Mode for Carrying Out the Invention below and accompanying drawings.

Advantages of the Invention

According to the present invention, it is possible, in updating firmware, to maintain reliability equal to that of the conventional dual configuration capable of resuming update and returning to a previous version in the case of occurrence of any trouble during update while saving the capacity of the nonvolatile memory for storing the firmware. Furthermore, it is possible to prevent system down due to failure in booting. Furthermore, it is possible to minimize the time for system stop due to reactivation.

BEST MODE FOR CARRYING OUT THE INVENTION

The present invention relates to a firmware update apparatus having fault tolerance, such as being capable of coping with a trouble during update, while reducing the capacity of a flash memory for storing firmware.

An embodiment of the present invention will be described with reference to accompanying drawings. However, it should be noted that the embodiment is only an example for realizing the present invention and does not limit the technical scope of the present invention.

<Configuration of Integrated Apparatus (Firmware Update Apparatus)>

Figure 1:
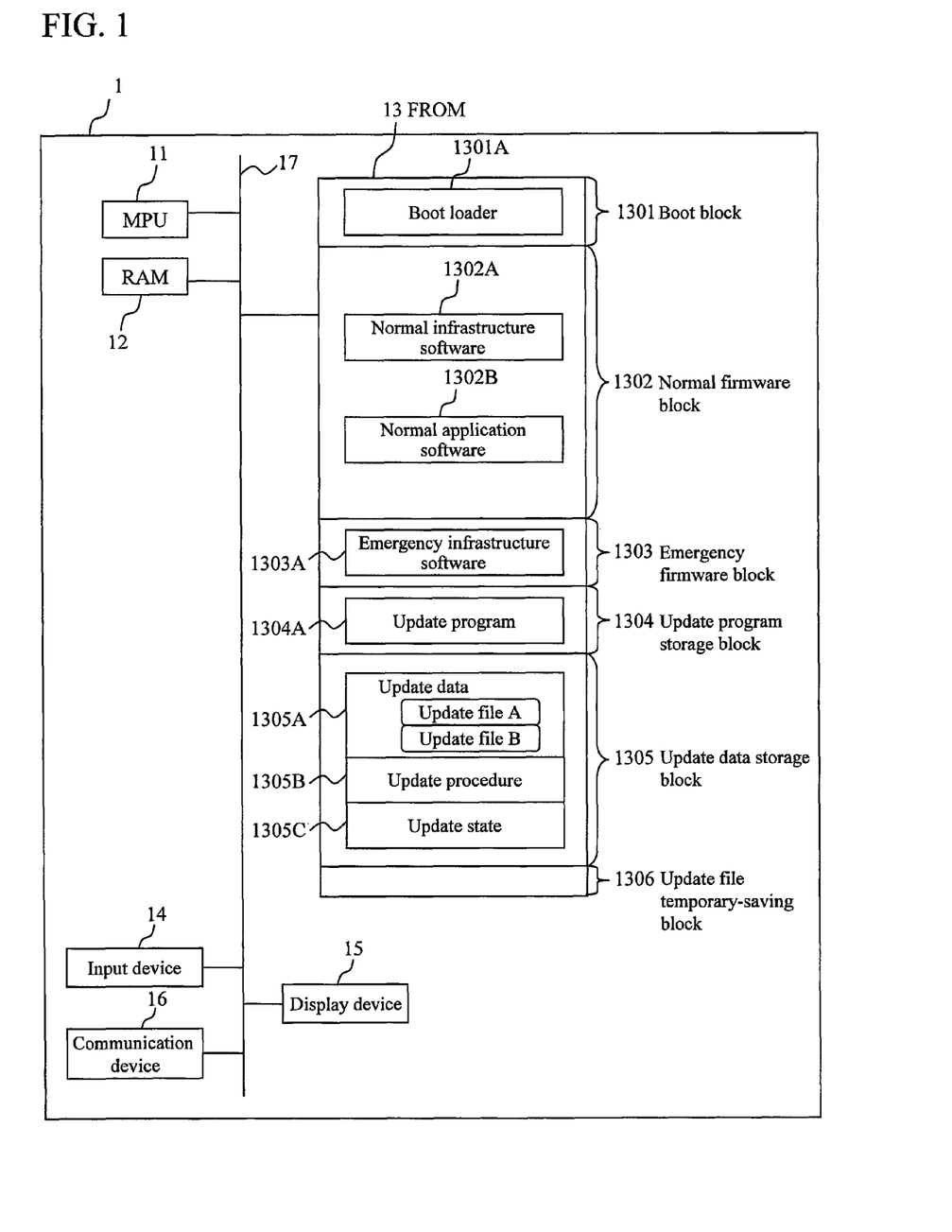
FIG. 1 is a diagram showing a schematic configuration of an integrated apparatus in an embodiment of the present invention.

FIG. 1 is a diagram showing a schematic configuration of an integrated apparatus according to the embodiment of the present invention. In the present invention, this integrated apparatus is assumed to be a home appliance, for example, a TV or the like.

An integrated apparatus 1 is configured by an MPU (CPU) 11, a RAM 12, an FROM 13, an input device 14, a display device 15, a communication device 16, and a bus 17 connecting them with one another.

The FROM 13 is a nonvolatile memory holding firmware. The FROM 13 is configured by a boot block 1301 which is executed first when the integrated apparatus 1 is activated, a normal firmware block 1302 which is used in a normal state in which there is no trouble in the integrated apparatus 1, an emergency firmware block 1303 which is used urgently when a trouble occurs in the integrated apparatus 1, an update program storage block 1304 which is used when the firmware is updated, an update data storage block 1305 which is used when the firmware is updated, and an update file temporary-saving block 1306 in which an update file is temporarily stored.

The boot block 1301 stores a boot loader 1301A which is executed first when the apparatus is activated and which is software for causing activation to be performed from set (specified) firmware at the time of activation. The boot loader reads any of the normal firmware block 1302 and the emergency firmware block 1303 after activation. Which of the normal firmware block 1302 and the emergency firmware block 1303 activation should be performed from, that is, the next-time boot destination is registered with the boot loader 1301A in advance by the MPU 11.

The normal firmware block 1302 stores normal infrastructure software (OS) 1302A and normal application software 1302B.

The emergency firmware block 1303 stores emergency infrastructure software 1303A which is provided with only minimum functions and the size of which is suppressed to be small in comparison with the normal infrastructure software 1302A. That is, the emergency infrastructure software 1303A is provided with only a function of mounting the update program storage block 1304, the update data storage block 1305 and the normal firmware block 1302 onto the RAM and calling them, that is, only a function of enabling an updated program to run. The emergency infrastructure software 1303A is not required to be provided with the same functions as the normal infrastructure software unlike a conventional firmware update apparatus.

The update program storage block 1304 stores an update program to be used when the normal infrastructure software 1302A and the normal application software 1302B are updated.

The update data storage block 1305 stores update data 1305A, which is difference data for each file between current firmware and new firmware, an update procedure 1305B in which an update procedure (which procedure and operation update should be executed in) is recorded, and an update state (log file) 1305C for recording an update procedure storage path specifying an update procedure being executed and an update procedure execution termination position indicating which part of the update procedure has been ended, for update to new firmware. Though update has been performed for each image (a mass of binary data) conventionally, update is performed for each file in the present invention.

<Operation of Normal Firmware>

Figure 2:
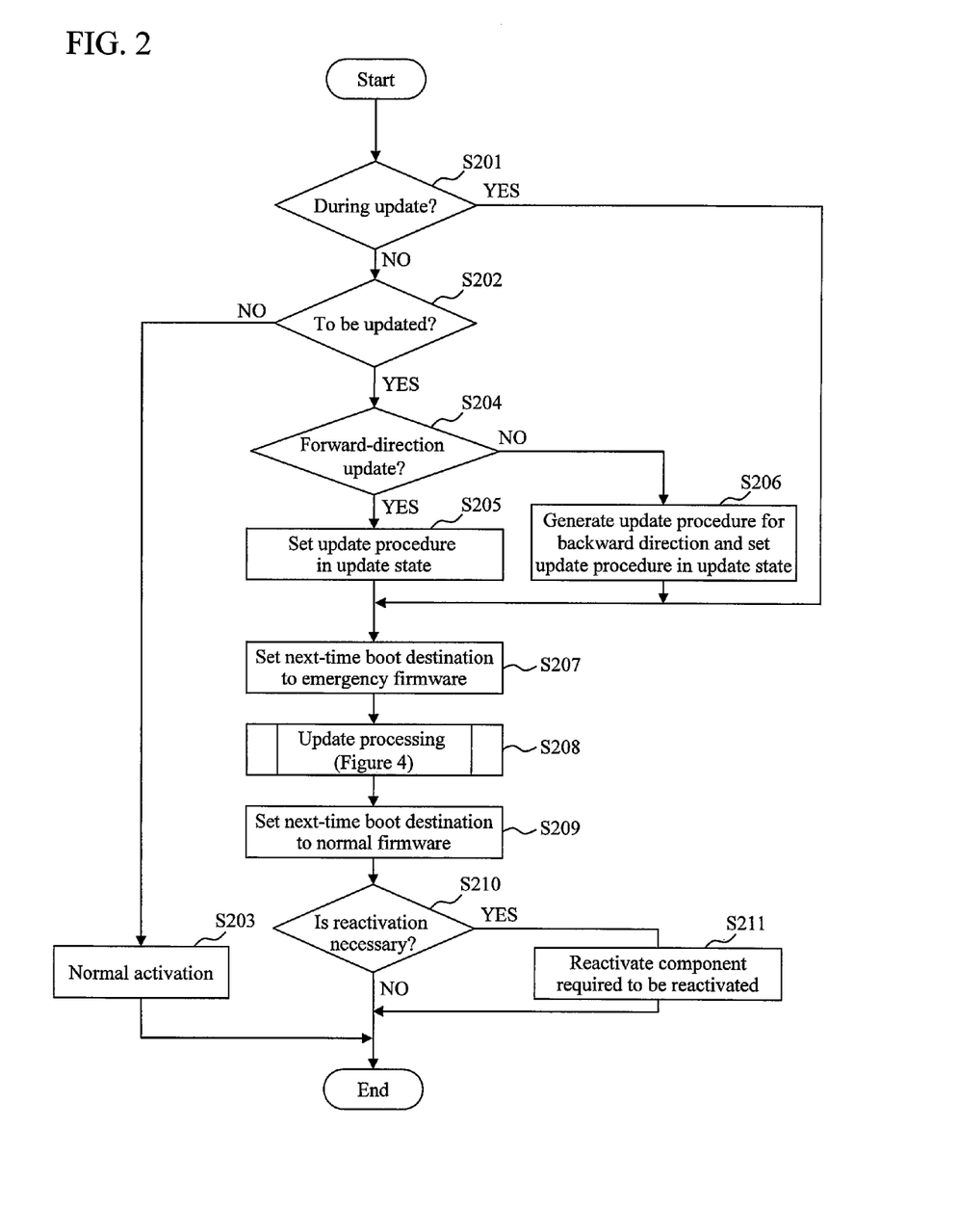
FIG. 2 is a flowchart for describing an operation of a normal firmware block performed immediately after activation.

FIG. 2 is a flowchart for describing an operation of the normal firmware block 1302 according to the embodiment of the present invention performed immediately after activation.

First, the MPU 11 judges whether firmware update processing is currently being performed or not (step S201). This judgment is performed by judging whether the update procedure storage path in the update state 1305C is NULL or not. If update is currently being performed, NULL is not shown. If update is not currently being performed, NULL is shown. If it is judged that update is currently being performed, the processing proceeds to step S207. If it is judged that update is not currently being performed, the processing proceeds to step S202.

At step S202, the MPU 11 judges whether or not to update firmware. For example, the MPU 11 inquires of the user of the integrated apparatus 1 using the input device 14 and the display device 15 or refers to a flag indicating whether update should be newly performed or update has already ended normally, which has been held by the update data 1305A. If update is not to be performed, the processing proceeds to S203, and the MPU 11 executes a normal activation procedure (step S203) and ends the processing.

When updating the firmware, the MPU 11 judges whether the update is to be performed in a forward direction or in a backward direction (step 204). The judgment is realized, for example, by the MPU 11 inquiring of the user of the integrated apparatus 1 using the input device 14 and the display device 15. In the case of the forward direction, the processing proceeds to step S205, where the MPU 11 sets the storage position of the update procedure 1305B in the update state 1305C (step S205). On the other hand, in the case of the backward direction, the processing proceeds to step S206, where the MPU 11 generates an update procedure for the backward direction on the basis of the update procedure 1305B and sets the storage position of the update procedure 1305B in the update state 1305C (step S206).

Figure 3A:
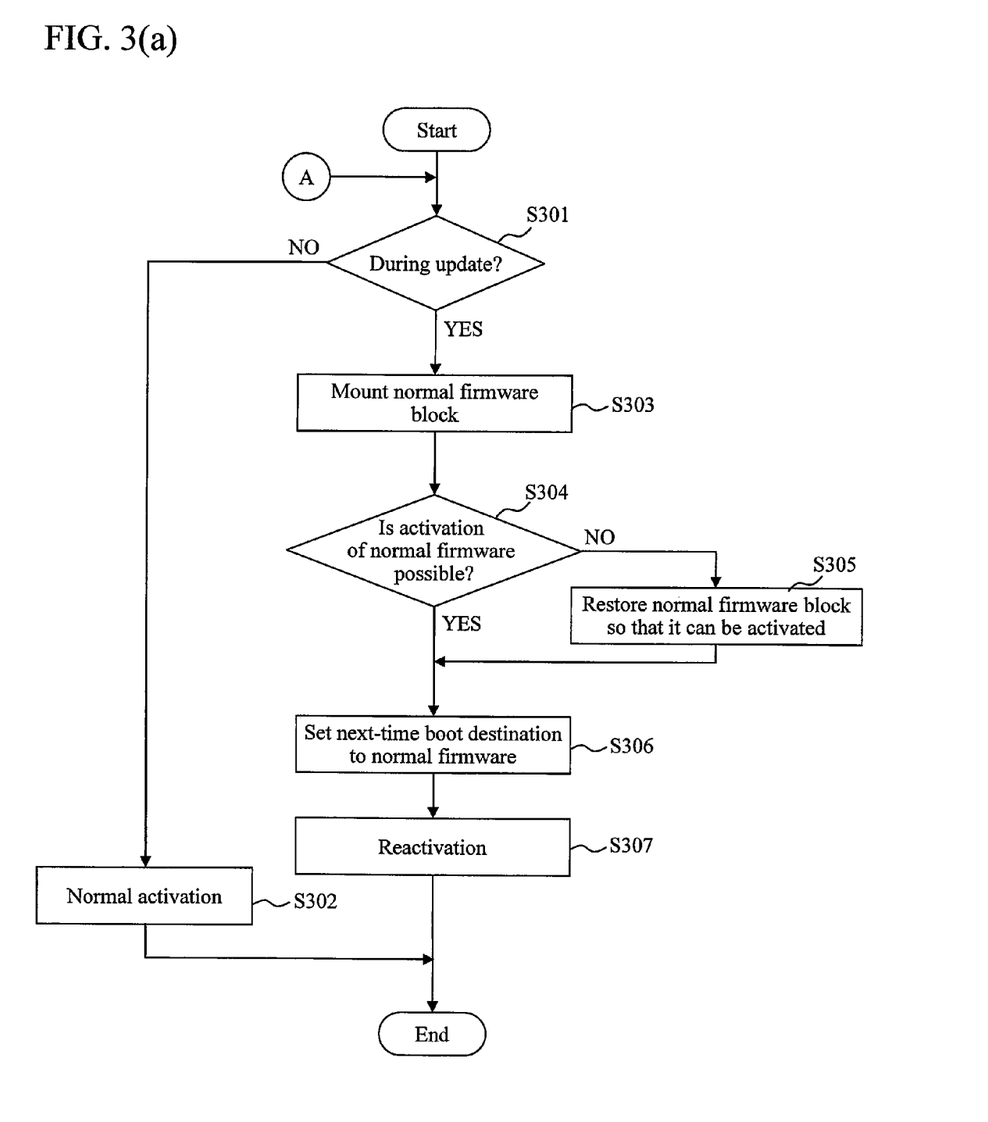
FIG. 3a is a flowchart (1) for describing an operation of an emergency firmware block performed immediately after activation.
Figure 3B:
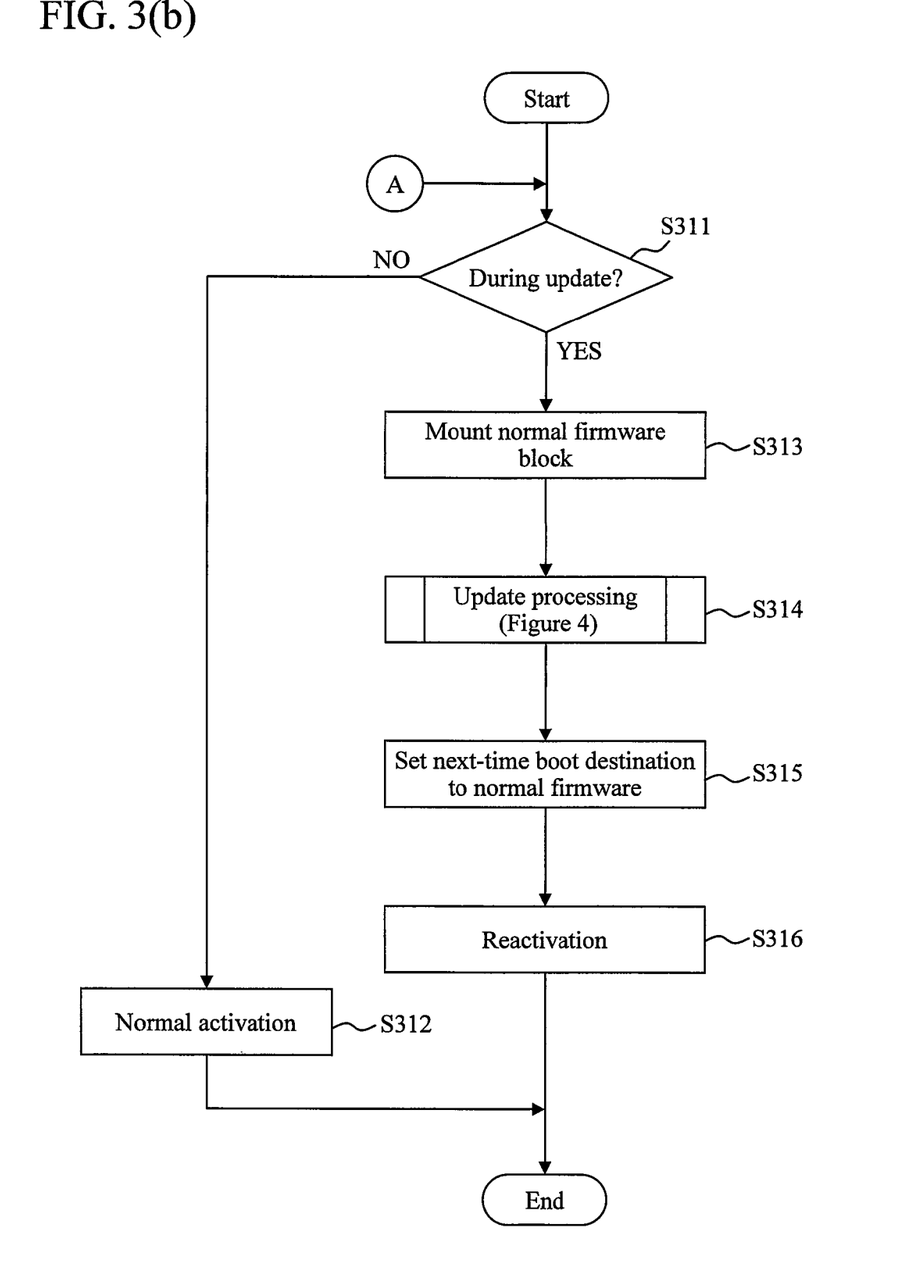
FIG. 3b is a flowchart (2) for describing an operation performed of the emergency firmware block immediately after activation.

Then, the MPU 11 sets the next-time boot destination to the emergency firmware block, in the boot loader (step S207). This is processing for enabling update of the remaining part of the firmware because the firmware is currently being updated. For example, in the case where the power is down while the normal infrastructure software 1302A is being rewritten, the user cannot activate the normal infrastructure software, and the manufacturer has to withdraw the apparatus. Therefore, the emergency firmware is used to execute the update program in such a case. The next-time start-up is executed from the emergency firmware block, that is, the processing in FIG. 3(a) or 3(b) is executed.

Then, the MPU 11 executes the firmware update processing on the basis of the update procedure (step S208). The details of the update processing will be further described with reference to FIG. 4.

Next, the MPU 11 sets the next-time boot destination to the normal firmware block, in the boot loader (step 209).

Furthermore, the MPU 11 judges, for an updated file, whether reactivation is necessary on the basis of the update procedure (step S210). If reactivation is necessary, the MPU 11 reactivates a necessary component in accordance with the update procedure (step S211) and ends. In the case of the dual configuration, reactivation is necessarily required when update is performed. However, in the case of the present invention, reactivation is unnecessary if update is completed normally. Reactivation is required only when there is an abnormality (for example, when power is down during update) (in the case of rewriting of the OS, reactivation may be required even if update ends normally, depending on the rewriting target).

The update procedure is constituted, for example, by a current version before update, a new version after update and the contents of update. For each target file, the contents of update are constituted by the contents of operations, a target file, and a reactivation target indicating a target to be reactivated. For example, when update for each service is sufficient, a service is specified as the update target. When it is necessary to reactivate the whole system, the whole system is specified as the update target. As for generation of the update procedure for the backward direction at step S206, for example, generation of a file is changed to deletion of the file, and deletion of a file is changed to generation of the file.

<Operation of Emergency Firmware Block>

As the operation of the emergency firmware block after being activated, for example, two kinds of operations are conceivable as shown in FIGS. 3(a) and 3(b).

(1) FIG. 3(a) is a flowchart for describing an operation of the emergency firmware block performed immediately after activation and performed when the normal firmware can be at least activated if it is modified.

First, the MPU 11 judges whether firmware update processing is currently being performed or not (step S301). Similarly as described above, this judgment is performed by judging whether the update procedure storage path in the update state 1305C is NULL or not. If update is currently being performed, NULL is not shown. If update is not currently being performed, NULL is shown. If it is judged that update is currently being performed, the processing proceeds to step S303. If it is judged that update is not currently being performed, the processing proceeds to step S302, where the MPU 11 executes a normal activation procedure (step S302) and ends the processing.

At step S303, the MPU 11 mounts the normal firmware block onto the RAM 12. This is because FIG. 3(a) relates to the case where activation is performed from the normal firmware.

Then, the MPU 11 inspects whether or not there is any fault in the normal firmware block and judges whether it is possible to perform activation immediately (step S304). If it is judged that it is not possible to perform activation, the processing proceeds to step S305, where the MPU 11 restores the normal firmware block to the state before the update to enable activation (step S305). For example, in the case where power is down during update processing after a file before update is stored in the update file temporary-saving block 1306, the file before update is taken out from this update file temporary-saving block 1306 to restore the state before update. On the other hand, if it is judged that activation is possible, the processing proceeds to step S306.

Then, the MPU 11 sets the next-time boot destination to the normal firmware (step S306) and performs reactivation (step S307). Reactivation is necessarily performed if start-up is performed from the emergency firmware.

(2) FIG. 3(b) is a flowchart for describing an operation of the emergency firmware block performed immediately after activation and performed when the normal firmware block cannot be activated. FIG. 3(b) shows a basic operation.

First, the MPU 11 judges whether firmware update processing is currently being performed or not (step S311). The judgment about whether update is currently being performed or not is as described above. If it is judged that update is currently being performed, the processing proceeds to step S313. If it is judged that update is not currently being performed, the MPU 11 executes a normal activation procedure (step S312) and ends the processing.

At step S313, the MPU 11 mounts the normal firmware block onto the RAM 12.

Then, the MPU 11 executes update processing (step S314). Then, the MPU 11 sets the next-time boot destination to the normal firmware (step S315) and performs reactivation (step S316).

Whether booting is possible or not is judged by checking the breakage state of a file required for booting at step S314. However, instead of or in addition to that, it is also possible to actually confirm that activation of the normal firmware is possible, by a virtualized environment enabling another OS to operate on the OS, which is provided in the emergency firmware area.

<Firmware Update Processing>

Figure 4:
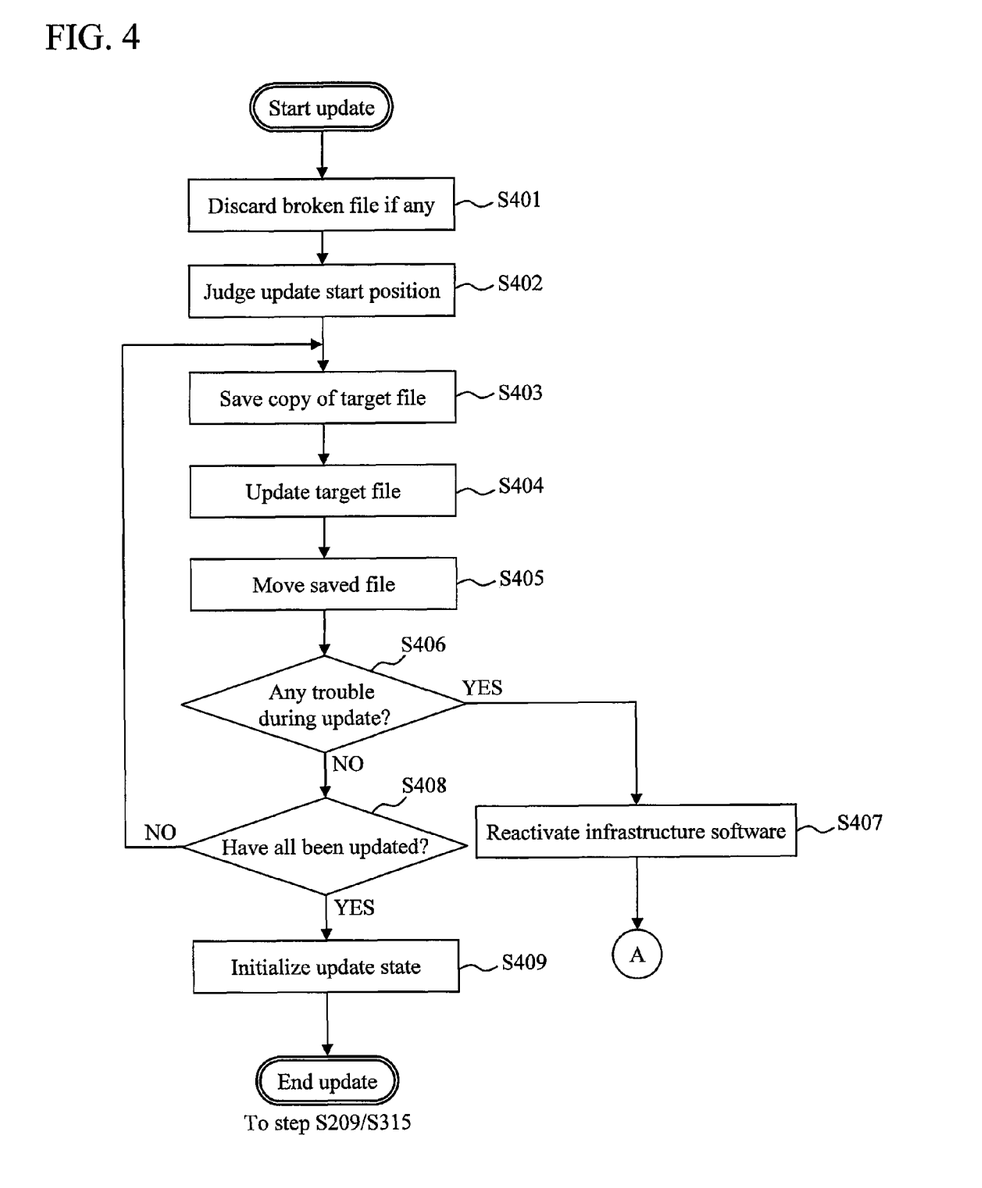
FIG. 4 is a flowchart for describing a detailed operation of firmware update processing.

FIG. 4 is a flowchart for describing the details of the firmware update processing.

First, if there is a broken file in the previous update processing, the MPU 11 discards the file (step S401). For example, if power is down during update, a broken file (a file only a part of which has been updated) may be included among files generated by the update processing. It is the processing of S401 that discards such a broken file. Update processing is performed for each file, and for which files the update processing has been completed is known by referring to the update state 1305C. Therefore, a file for which update has not been completed can be detected.

Next, the MPU 11 judges an update start position on the basis of the update procedure 1305B and the update state 1305C (step S402) and saves a copy of an update target file into the update file temporary-saving block 1306 (step S403).

Then, the MPU 11 updates the update target file in accordance with the update procedure 1305B (step S404).

Next, the MPU 11 deletes appropriate update files (update files A, B, . . . ) in the update data 1305A and moves the saved files (files before update) stored in the update file temporary-saving block 1306 into the update data 1305A instead (step S405). Conventionally, there simply exists a backup area, and files before update are stored in the backup area. However, by executing step S405 in the present invention, the firmware capacity can be saved. The capacity of the update file temporary-saving block 1306 is determined to be of the maximum file size of the integrated apparatus 1 in advance.

Furthermore, the MPU 11 judges whether a trouble occurred during the update processing of S404 (step S406). If it is judges that a trouble occurred, the processing proceeds to step S407. If it is judged that a trouble did not occur, the processing proceeds to step S408.

At step S407, the MPU 11 reactivates the infrastructure software (normal or emergency infrastructure software) and starts the processing of FIG. 2 or FIG. 3 from the beginning. On the other hand, at step S408, the MPU 11 checks whether or not the update processing has been completed for all the files. If any file has not been updated, the processing returns to step S403. If all the files have been updated, the processing proceeds to step S409. At step S409, the MPU 11 initializes the update state 1305C, and the update processing ends. If the update processing ends, the processing proceeds to step S209 in FIG. 2 or step S315 in FIG. 3(*b*).

As for the processing from step S403 to step S405, it is also possible to store an updated file into the update file temporary-saving block 1306, delete an appropriate file in update data after that, moves a file before update to the update data storage area instead, and move the updated file to the normal firmware block.

CONCLUSION

In the embodiment of the present invention, there are held in a nonvolatile memory: a boot loader for reading firmware, normal firmware which normally operates and emergency firmware which operates in the case of emergency, such as at the time of failure in rewriting of the normal firmware, an update program accessible from both of the normal and emergency firmware, update data constituted only by changed files, within the normal firmware, an update procedure in which an update method is described, an update state in which update progress is recorded, and an update file temporary-saving area into which, during update of a file, the file before update or an updated file is temporarily stored. By constituting the update data only by changed files, within the normal firmware, setting the capacity of the update file temporary-saving area to the capacity of the maximum file size determined in advance and storing a file before update into an area occupied by an updated file after update of the file, the capacity of the nonvolatile memory is suppressed to be small.

The configuration is such that both of the normal firmware and the emergency firmware can access data required for update. The next-time boot destination is set to the emergency firmware immediately before update, and the next-time boot destination is set to the normal firmware immediately after update. Thereby, it is possible to, when a trouble occurs during update, resume update from the point at which the trouble occurs, and it is possible to recover the state before update by a saved file before update and a new update procedure automatically generated by reversing the contents of operations of an update procedure.

Furthermore, during activation of the emergency firmware, it is inspected whether there is any breakage of a file required for booting the normal firmware. Thereby, it is possible to avoid the system from stopping due to failure in activation of the normal firmware afterward.

Furthermore, there is prepared a virtualized environment enabling an another OS to operate within the OS, which is provided within the emergency firmware area, during activation of the emergency firmware to actually confirm that activation of the normal firmware is possible. Thereby, it is possible to avoid the system from stopping due to failure in activation of the normal firmware afterward.

Furthermore, rewriting of the normal firmware is performed, and, for each update file, the whole system or a certain service is described as the target requiring reactivation, or it is described that reactivation is not required at all, in the update procedure. Thereby, it is possible to minimize the system stop time.

The present invention can be realized by a program code of software realizing the functions of the embodiment. In this case, a storage medium in which the program code is recorded is provided for a system or an apparatus, and a computer (or a CPU or an MPU) of the system or the apparatus reads the program code stored in the recording medium. In this case, the program code itself read from the recording medium realizes the functions of the embodiment described before, and the program code itself and the recording medium in which the program code is stored constitute the present invention. As the recording medium for providing such a program code, for example, a flexible disk, CD-ROM, DVD-ROM, hard disk, optical disk, magneto-optical disk, CD-R, magnetic tape, nonvolatile memory card, ROM or the like is used:

It is also possible for an OS (operating system) or the like operating on a computer to perform a part or all of the actual processing on the basis of instructions of the program code so that the functions of the embodiment described before are realized by the processing. Furthermore, it is also possible for the CPU or the like of a computer to perform, after the program code read from the storage medium is written into the memory on the computer, a part or all of the actual processing on the basis of instructions of the program code so that the functions of the embodiment described before are realized by the processing.

Furthermore, it is also possible to, by distribution of the program code of the software realizing the functions of the embodiment via a network, store it into storing section, such as a hard disk and a memory of a system or an apparatus, or a storage medium, such as a CD-RW and CD-R, and for a computer (or a CPU or an MPU) of the system or the apparatus to read and execute the program code stored in the storing section or the storage medium when the program code is used.

DESCRIPTION OF SYMBOLS

1 . . . integrated apparatus
11 . . . MPU
12 . . . RAM
13 . . . FROM
14 . . . input device
15 . . . display device
16 . . . communication device
1301 . . . boot block
1302 . . . normal firmware block
1303 . . . emergency firmware block
1304 . . . update program storage block
1305 . . . update data storage block
1306 . . . update file temporary-saving block
1301A . . . boot loader
1302A . . . normal infrastructure software
1302B . . . normal application software
1303A . . . emergency infrastructure software 1304A . . . update program
1305A . . . update data
1305B . . . update procedure
1305C . . . update state

The invention claimed is:

1. A firmware update method for updating firmware in an integrated apparatus in which the firmware is integrated, wherein,
   the integrated apparatus comprises an operation processing section which executes firmware update processing for each file of the firmware in accordance with an update program, a volatile memory which temporarily stores data, and a nonvolatile memory which continuously stores data; wherein:
   the nonvolatile memory includes normal firmware which operates at normal times, emergency firmware which operates in the case of emergency, including the time of failure in rewriting of the normal firmware, an update data area for storing an update file, and a temporary-saving area for temporarily storing a file before update; and
   the emergency firmware is of a smaller size than the normal firmware and is provided with only a function of mounting onto the volatile memory and calling the update program, update data or the normal firmware;
   the method comprising:
   a step of, in the case of performing update processing of the normal firmware, the operation processing section setting the next-time boot destination to the emergency firmware before the update processing and executing the update processing, and, after the update processing, setting the next-time boot destination to the normal firmware; and
   wherein the operation processing section performs steps of storing the file before update into the temporary-saving area, deleting the file before update stored in the temporary-saving area from the temporary-saving area after executing the update processing, and storing the file before update into the update data area by replacing the corresponding update file with the file.

2. The firmware update method according to claim 1, wherein,
   the nonvolatile memory includes an update procedure description area in which an update procedure is described, and an update state description area in which an update state of each of files constituting the normal firmware is described; and
   the method comprises a step of the operation processing section executing the update program in accordance with the update procedure and describing an update log in the update state description area.

3. The firmware update method according to claim 2, Wherein,
   the update procedure includes, for each of the files constituting the normal firmware, information about whether or not reactivation is necessary when the update processing is completed; and
   the method comprises a step of the operation processing section reactivating a file required to be reactivated in accordance with the update procedure after the update processing ends.

4. The firmware update method according to claim 1, comprising a step of, if the emergency firmware is activated, the operation processing section checking whether there is a breakage of a file required for booting the normal firmware, and setting the next-time boot destination to the normal firmware after executing the update processing.

5. The firmware update method according to claim 1, comprising a step of, when the emergency firmware is activated, the operation processing section judging whether or not activation of the normal firmware is possible, and setting the next-time boot destination to the normal firmware if activation is possible.

6. The firmware update method according to claim 1, comprising a step of, when the emergency firmware is activated, the operation processing section judging whether or not activation of the normal firmware is possible, and, if activation is not possible, restoring the normal firmware to a state in which activation is possible, using the files before update which are stored in the temporary-saving area, and then setting the next-time boot destination to the normal firmware.

7. A firmware update apparatus comprising firmware and provided with a function of updating the firmware, the firmware update apparatus comprising:
   an operation processing section which executes firmware update processing for each file of the firmware in accordance with an update program;
   a volatile memory which temporarily stores data; and
   a nonvolatile memory which continuously stores data; wherein:
   the nonvolatile memory includes normal firmware which operates at normal times, emergency firmware which operates in the case of emergency, including the time of failure in rewriting of the normal firmware, an update data area for storing an update file, and a temporary-saving area for temporarily storing a file before update;
   the emergency firmware is of a smaller size than the normal firmware and is provided with only a function of mounting onto the volatile memory and calling the update program, update data or the normal firmware;
   in the case of performing update processing of the normal firmware, the operation processing section sets the next-time boot destination to the emergency firmware before the update processing and executes the update processing, and, after the update processing, sets the next-time boot destination to the normal firmware; and
   the operation processing section stores the file before update into the temporary-saving area, deletes the file before update stored in the temporary-saving area from the temporary-saving area after executing the update processing, and stores the file before update into the update data area by replacing the corresponding update file with the file.

8. The firmware update apparatus according to claim 7, wherein,
   the nonvolatile memory includes an update procedure description area in which an update procedure is described, and an update state description area in which an update state of each of files constituting the normal firmware is described; and
   the operation processing section executes the update program in accordance with the update procedure and describes an update log in the update state description area.

9. The firmware update apparatus according to claim 8, wherein;
   the update procedure includes, for each of the files constituting the normal firmware, information about whether or not reactivation is necessary when the update processing is completed; and
   the operation processing section reactivates a file required to be reactivated in accordance with the update procedure after the update processing ends.

10. The firmware update apparatus according to claim 7, wherein, if the emergency firmware is activated, the operation processing section checks whether there is a breakage of a file required for booting the normal firmware, and sets the next-time boot destination to the normal firmware after executing the update processing.

11. The firmware update apparatus according to claim 7, wherein, when the emergency firmware is activated, the operation processing section judges whether or not activation of the normal firmware is possible, and, if activation is possible, sets the next-time boot destination to the normal firmware.

12. The firmware update apparatus according to claim 7, wherein, when the emergency firmware is activated, the operation processing section judges whether or not activation of the normal firmware is possible, and, if activation is not possible, restores the normal firmware to a state in which activation is possible, using the files before update stored in the temporary-saving area, and then sets the next-time boot destination to the normal firmware.

\* \* \* \* \*